United States Patent

[11] 3,601,848

[72] Inventor Richard Zippel, Jr.
12-27, Bremer Strasse, 344 Eschwege, Germany
[21] Appl. No. 802,519
[22] Filed Feb. 26, 1969
[45] Patented Aug. 31, 1971
[32] Priority Mar. 7, 1968
[33] Germany
[31] P 17 29 133.7

[54] MACHINES FOR MAKING TUBES, LAMINATED RODS, AND LAMINATED STRIPS FROM LIQUID MULTICOMPONENT PLASTIC MATERIAL
11 Claims, 8 Drawing Figs.

[52] U.S. Cl. .................................................. 18/4 B, 264/172
[51] Int. Cl. .................................................. B29c 15/00
[50] Field of Search .......................................... 264/172; 18/4 B, 4 R, 4 G, 4 S

[56] References Cited
UNITED STATES PATENTS
2,287,830  6/1942  Postlewaite ................. 18/4 S X
3,303,529  2/1967  Boggs ......................... 18/4 S FOREIGN PATENTS
842,267  9/1952  Germany ...................... 18/4 (B)

Primary Examiner—J. Spencer Overholser
Assistant Examiner—L. R. Frye
Attorney—Nolte and Nolte ABSTRACT: A machine for making tubes, pipes, laminated rods, and laminated strips from liquid multicomponent plastic material comprises two endless traveling moulding belts between which the plastic material is introduced while in a viscous or pastelike state through a nozzle while a core material and if desired outer layer material are simultaneously introduced between the belts. The core material may be a hose, means being provided for feeding a fluid under pressure to the hose to blow it up into tubular shape, means being provided for removing the hose from the tube when being formed. Alternatively, the nozzle may form the end of a mandrel which carries one or two lengths of hose, a pulsating fluid being supplied to the hose or hoses to inflate and deflate the same, the mandrel reciprocating in synchronism with the pulsations of the fluid. If two hoses are provided, one hose may be mounted on a tubular member reciprocatably mounted on the mandrel, movements of the mandrel and the tubular member being in counterphase to one another.

INVENTOR
RICHARD ZIPPEL

BY
*Nolte & Nolte*
ATTORNEYS

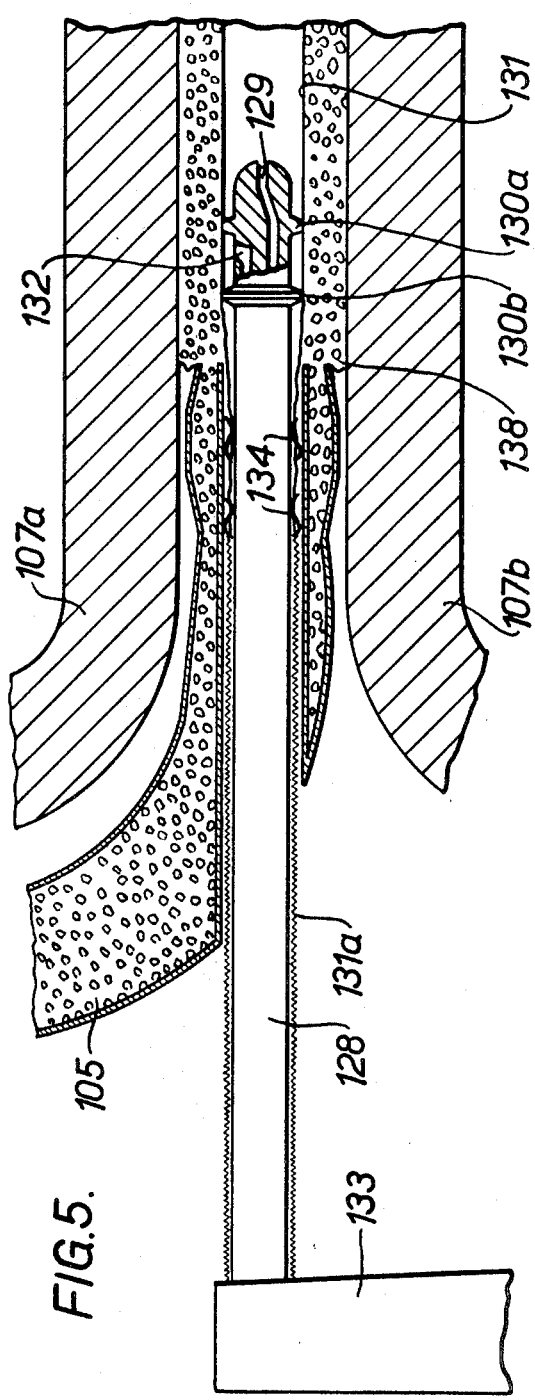
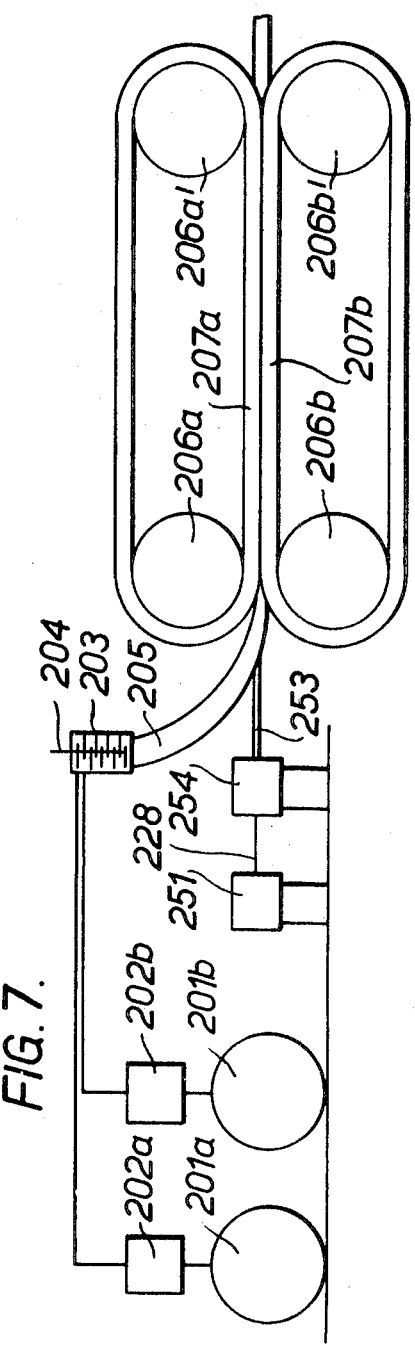
INVENTOR
RICHARD ZIPPEL
BY
*Nolte & Nolte*
ATTORNEYS

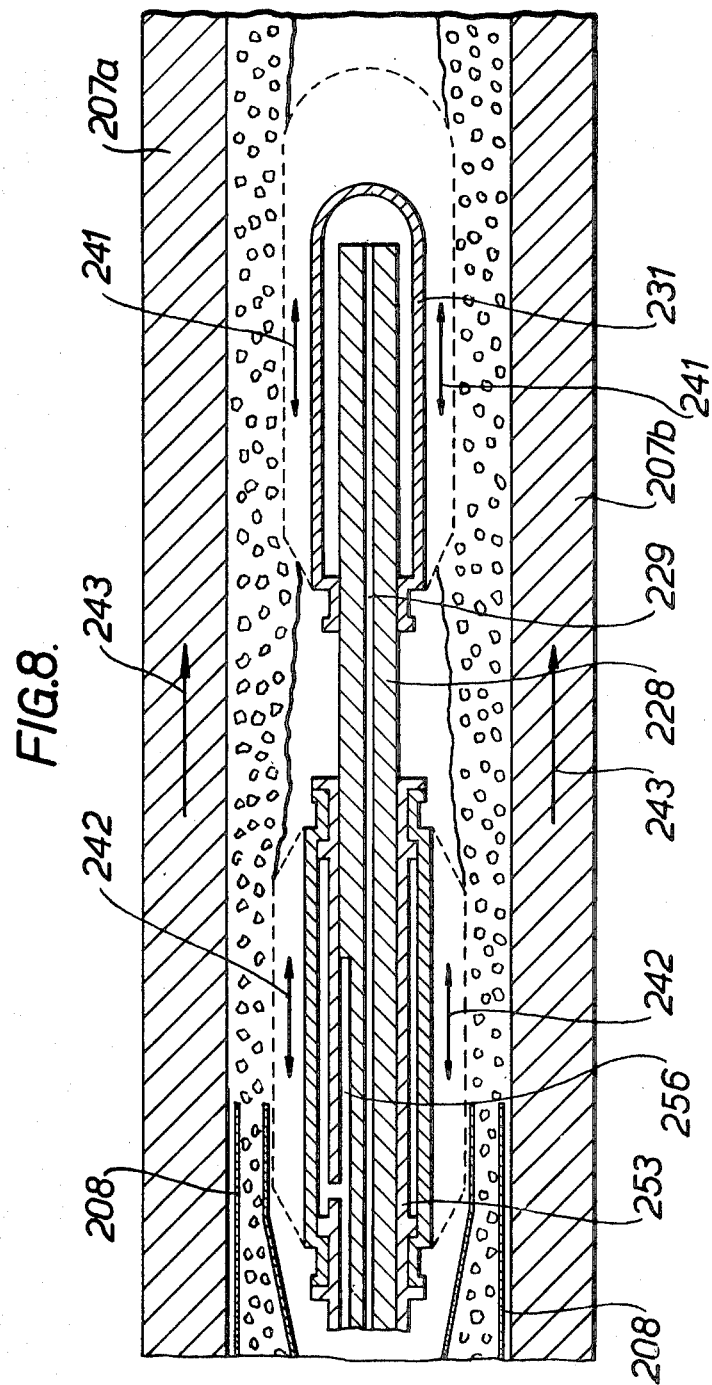

MACHINES FOR MAKING TUBES, LAMINATED RODS, AND LAMINATED STRIPS FROM LIQUID MULTICOMPONENT PLASTIC MATERIAL

BACKGROUND OF THE INVENTION

The invention relates to a machine for making tubes, pipes, laminated rods, and laminated strips from liquid multicomponent plastic material, the machine comprising two endless moulding belts, the multicomponent plastic material being fed through a nozzle between the moulding belts.

It is known that thermoplastic materials are mouldable into rods and tubes on extruders. However, difficulties are encountered with liquid multicomponent plastic materials which harden after mixing the components together. For the production of moulded sections from liquid multicomponent plastic material, which has been mixed in a mixing chamber, it has previously been proposed to force the multicomponent plastic material from the mixing chamber into moulds, which are closed when charged, each mould having two parts, one part being fixed to the upper run of an endless conveyor belt and the other part being fixed to the parallel lower run of a second endless conveyor belt. Alternatively, when the endless conveyor belts are made of silicone rubber, polyethylene or the like and are suitably shaped, they themselves may serve as a mould. Such conveyor belts facilitate the production and operation of the moulding machine. The advantage of using multicomponent plastic materials is that the resultant tubes, rods and the like are less affected by heat than tubes, rods and the like made from thermoplastic materials, that the tubes, rods and the like may be provided with transverse ribs and other patterns and that they can be made of foamed plastic materials, which may be hard foamed or soft foamed plastic material. Hard foamed plastic material may be used, for example, for making rods, while soft foamed plastic material may be used, for example, for making yieldable strips.

However, with the previously proposed machines it has not been possible to produce tubes, laminated rods and the like and to laminate such articles during the production thereof.

It is an object of the present invention to provide a moulding machine for making tubes, pipes, rods, and strips from multicomponent plastic material, which articles are laminated by moulding on to them or into them strips of textile fabrics, of plastic material, of glass fibers or the like.

Of particular importance is the production of tubes from foamed multicomponent plastic material since such tubes or pipes are of heat insulating qualities and therefore suitable for carrying hot fluids. Furthermore, such tubes may be used as surgical drain tubes.

Accordingly it is another object of the invention to provide a moulding machine for making tubes and pipes from multicomponent plastic material which is foamed.

SUMMARY OF THE INVENTION.

The invention consists in a machine for making tubes, pipes, laminated rods, and laminated strips from liquid multicomponent plastic material, comprising two endless moulding belts, means including a nozzle for feeding the multicomponent plastic material through the nozzle between the moulding belts, means for feeding a tube or strip material between the moulding belts, and means for controlling the flow of the multicomponent plastic material in such a way that it arrives between the moulding belts as a paste.

Means may be provided for feeding a tubing of polyethylene between the moulding belts, there being provided means for feeding into the tubing a fluid under pressure, and means for removing the fluid from the tubing when the multicomponent plastic material has set.

Other features of the invention will become apparent from the following detailed description of three preferred embodiments.

BRIEF DESCRIPTION OF THE DRAWINGS.

To make the invention clearly understood reference will now be made to the accompanying diagrammatic drawings, which are given by way of example and in which:

FIG. 5 illustrates a part of the machine of FIG. 4 on a larger scale and partly in section;

FIG. 7 illustrates a third embodiment of a moulding machine of the invention; and FIG. 8 is a section through a part of the machine of FIG. 7 on a larger scale.

DESCRIPTION OF THE PREFERRED EMBODIMENTS.

Figure 1:
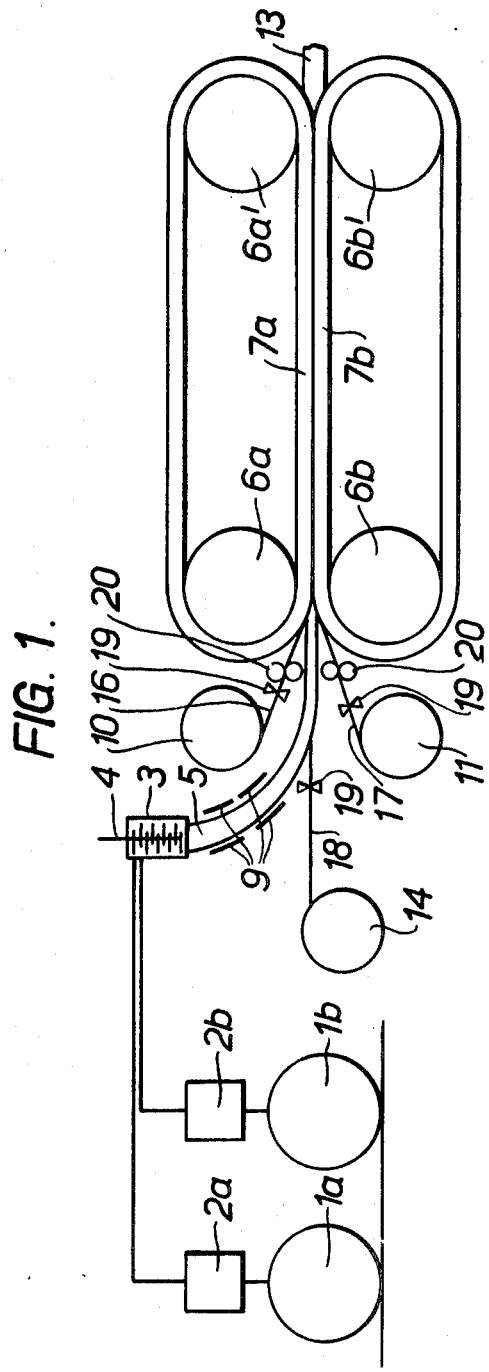
FIG. 1 illustrates a first embodiment of a moulding machine of the invention.
Figure 2:
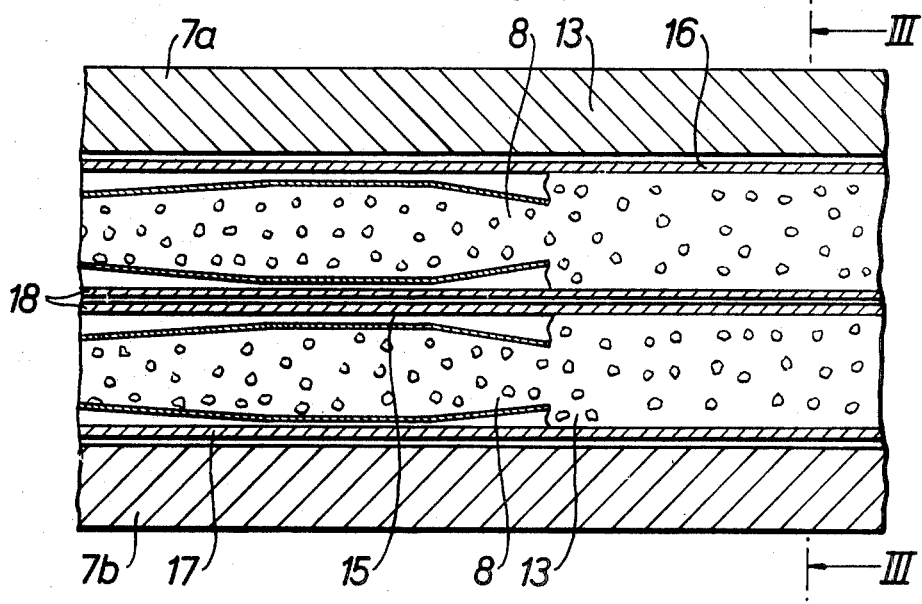
FIG. 2 is a section through a part of the machine of FIG. 1 on a larger scale.
Figure 3:
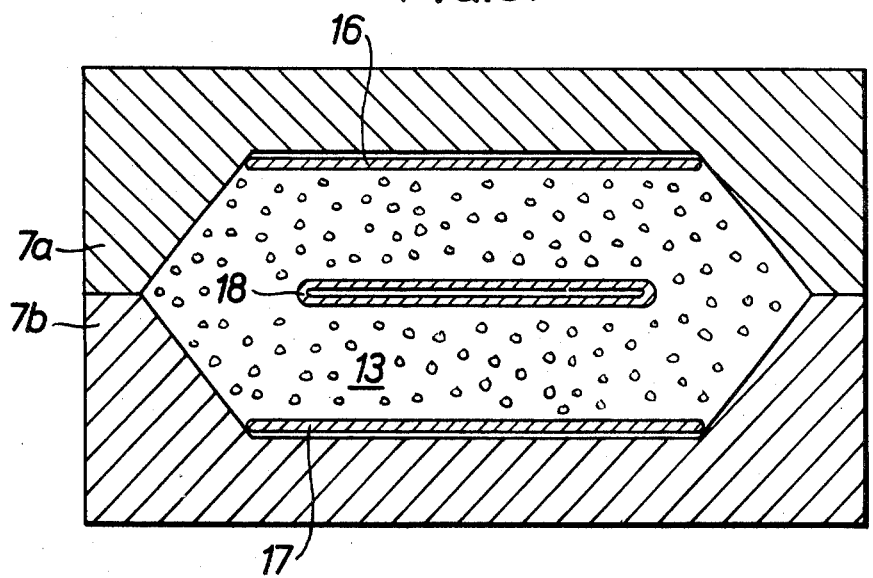
FIG. 3 is a section along the line III—III of FIG. 2.

The machine of FIGS. 1, 2 and 3 comprises two containers $1a$ and $1b$ for storing the components of a liquid multicomponent plastic material which are fed by flow metering pumps $2a$ and $2b$ into a mixing chamber 3 provided with a stirring device 4. The multicomponent plastic material flows from the mixing chamber 3 through a feed pipe 5 to a nozzle 8 (FIG. 2) between endless moulding belts $7a$ and $7b$, which travel round driving and guiding rollers $6a$, $6a'$, $6b$ and $6b'$. Heaters 9 are fitted adjacent the feed pipe 5 to heat material therein.

Strips 16, 17 of textile fabric, plastic material or glass fibers, which it is desired to bond to a body 13, which is being produced, are supplied from storage rolls 10 and 11. From a further storage roll 14 runs a flat tubing 18 which is introduced into the body 13 of multicomponent plastic material while it is being formed. The tubing 18 forms a lining on the hollow interior walls of the body 13. The tubing 18 drawn from the further storage roll 14 travels through a central slot 15 (FIG. 2) in the nozzle 8 and is thereby positioned centrally within the body 13. The strips 16 and 17 are drawn from the storage rolls 10 and 11 and the tubing 18 is drawn from the further storage roll 14 by the force exerted by the two endless moulding belts $7a$ and $7b$. A separate drive is thus not required, since the plastic material of the body 13, as it sets and becomes rigid, automatically draws the strips 16, 17 and the tubing 18 from the respective storage rolls 10, 11, 14. However, brakes 19 for the strips 16, 17 and the tubing 18 and additional rollers 20 positioned obliquely to the direction of travel of the strips 16, 17 are provided for straightening the strips 16, 17 and the tubing 18.

When the moulded body 13 emerges from the moulding machine, the strips 16 and 17 are bonded firmly to the outside of the body 13, the tubing 18 being firmly bonded to the interior walls of the body 13, (FIG. 3). When a foaming multicomponent plastic material is used, the tubing 18 may be made of thin material which is fed into the moulding machine in the shape of a strip having two superposed layers. When the body 13 is in use, it assumes a tubular shape when a fluid is fed to the interior of the tubing 18 within the body 13.

Alternatively, a tubing which is circular or angular in cross section may be introduced through a ring-shaped nozzle into the body 13 while being produced. The strips 16, 17 form outer coverings and may be of a hard multicomponent plastic material. Such tubes are usable for a wide range of technological purposes. When the multicomponent plastic material of the body 13 is foamed, such pipes or tubes have excellent heat-insulating properties.

The machine just described ensures that the multicomponent plastic material has already started to set, when the strips 16, 17 and the tubing 18 are bonded to the plastic material. It is thereby possible to produce a reliable bond between the main body 13 of multicomponent plastic material and the strips 16, 17 and tubing 18.

By suitably adjusting the heating effect of the heaters 9 and the length of the feedpipe 5 the originally liquid multicomponent plastic material is caused to emerge from the nozzle 8 as a paste or a liquid of high viscosity. This ensures that the tubing 18 stays in the position relative to the main part of the body 13 in which it is introduced, the multicomponent plastic material being of such a consistency that the tubing 18 can not substantially change its position during the final setting of the multicomponent plastic material. It should be noted that in most cases, the final setting takes place rapidly once the material has started to assume its pastelike consistency.

The mechanical means whereby the material in strip form is introduced without folds and wrinkles comprises at least one storage roll 10 or 11, a brake 19 acting on the strip and guide rollers 20. In many cases, it is of advantage to fit a pair of rollers 20, one at each side of the strip, the rollers being positioned obliquely in relation to the direction of travel of the respective strip. Such rollers pull the strip smooth and taut.

Within the feed pipe 5 a preliminary reaction between the components may take place which is followed by setting, or the reaction may include the initial stage of setting, in which the multicomponent plastic material changes from the fluid state either to a condition in which it will shortly become pastelike or to the pastelike condition itself. The viscosity of the plastic material leaving the nozzle 8 can be varied by varying the feed rate, which should be matched to the travelling speed of the moulding belts 7a, 7b. The viscosity of the material can also be changed by altering the length of the feed pipe 5, but the simplest way of varying the viscosity of the multicomponent plastic material leaving the nozzle 8 is by suitably varying the heating effect of the heaters 9 on the material while it is in the feed pipe 5.

Figure 4:
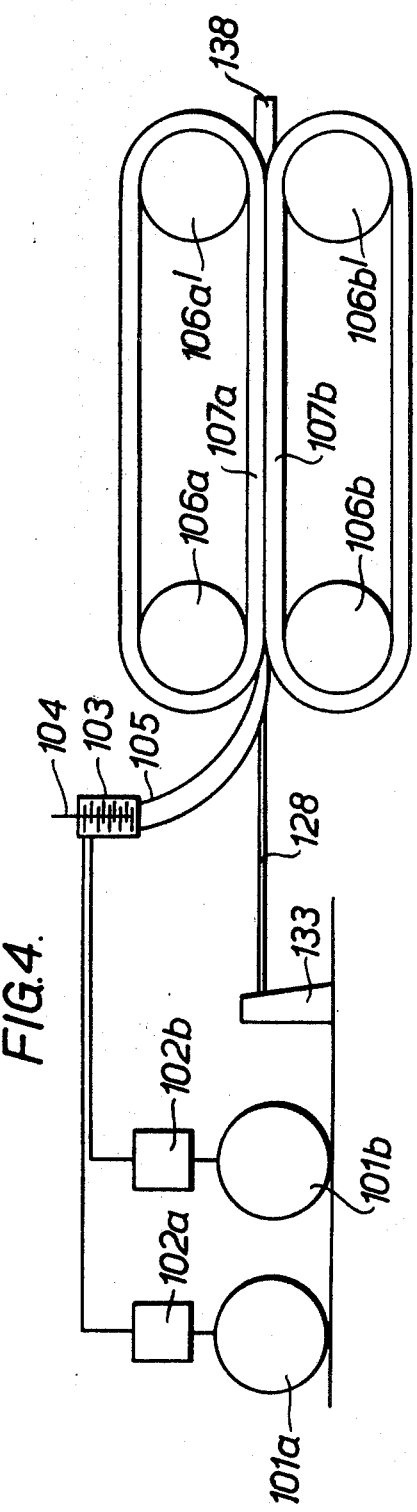
FIG. 4 illustrates a second embodiment of a moulding machine of the invention.
Figure 6:
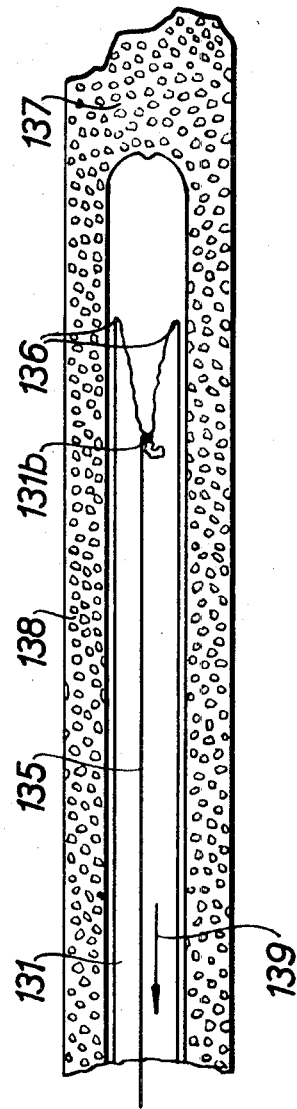
FIG. 6 is a section through a tube being produced by the machine of FIGS. 4 and 5.

In FIGS. 4, 5 and 6 the same reference numbers but increased by "100" indicate parts similar to those of FIGS. 1, 2 and 3.

The machine of FIGS. 4, 5 and 6 comprises two containers 101a and 101b in which the components of a multicomponent plastic material are stored, which are fed by flow metering pumps 102a and 102b into a mixing chamber 103 provided with a stirring device 104. The multicomponent plastic material flows from the mixing chamber 103 through a feedpipe 105 and between endless moulding belts 107a and 107b which travel round the driving and guiding rollers 106a, 106a', 106b and 106b'. A mandrel 128 extends between the moulding belts 107a and 107b. The mandrel 128 has a passage 129 for compressed air (FIG. 5). The periphery of the mandrel 128 carries protruding rings 130a and 130b over which a polyethylene hose 131 is fed forward. Through the passage 129 compressed air flows into that portion of the polyethylene hose 131 which lies beyond the mandrel 128. Some of the compressed air escapes past the ring 130a and, within the space between the two rings 130a and 130b, passes into a further passage 132, through which the escaping compressed air is discharged into the atmosphere. The mandrel 128 is held by a stand 133 fixed to the frame of the machine. On its end adjacent the stand 133, the mandrel 128 carries a sufficient supply 131a of polyethylene hose 131 for the production of tubes 138 each of 10 meter to 20 meter lengths. FIG. 5 shows how the mandrel 128 extends between the moulding belts 107a 107b. Spring means 134 are provided for the polyethylene hose 131 to be kept taut and for only as much to be drawn from the supply 131a and allowed to pass between the moulding belts 107a and 107b as is required to enable the polyethylene hose 131 to travel along with the belts 107a, 107b without forming folds or wrinkles.

A thread 135 (FIG. 6) is connected to the end 131b of the hose 131 remote from the stand 133 to serve as a means for extracting the polyethylene hose 131 from the tube of multicomponent plastic material which is being produced by drawing the thread 135 in the direction of the arrow 139. During extraction the polyethylene tubing 131 is detached at the region 136, where it is folded back, from the tube 138. As will be obvious, the leading portion 137 of the tube 138 is cut off approximately along the line A—A. The cutoff portion 137 of the tube 138 is closed at one end to ensure that the polyethylene hose 131 is firmly attached to the tube 138 at the leading end 137 thereof.

In FIGS. 7 and 8 the same reference numbers but increased by "200" indicate parts similar to those of FIGS. 1, 2 and 3.

The multicomponent plastic material is produced and fed in the machines of FIGS. 7 and 8 in the same manner in the machine of FIGS. 4, 5 and 6. Extending between the endless moulding belts 207a and 207b is a mandrel 228 (FIG. 8) which has an internal passage 229 for compressed air to enable the production of pipes and tubes. The compressed-air passage 229 opens into a length of polyethylene hose 231 which hose is acted upon by a pulsating supply of fluid under pressure. The mandrel 228 is fitted in such a way that it reciprocates in the axial direction as indicated by the double arrows 241 in synchronism with the pulsating pressure fluid. For this purpose the mandrel 228 is mounted in bearings of a reciprocatable drive mechanism 251 (FIG. 7). This drive mechanism 251 comprises a pressure-fluid cylinder housing a piston reciprocating in synchronism with the pressure fluid acting on the length of the hose 231. Reciprocating cylinder piston arrangements are well known in the art and therefore not described in detail.

A tubular member 253 forms a sliding fit on the mandrel 228. Motion is imparted to the tubular member 253 by a second drive mechanism 254 in the form of a pressure-fluid cylinder and piston arrangement so that the tubular member 253 reciprocates in counterphase to the mandrel 228 as indicated by the double arrows 242. The tubular member 253 carries a length of hose 255 of polyethylene, which is acted upon by a pulsating pressure fluid supplied through a passage 256. This pulsating pressure fluid acts upon the length of hose 255 on the tubular member 253 in counterphase to the pulsating pressure fluid supplied through the pressure-fluid passage 229 which acts on the length of hose 231 on the mandrel 228. The direction of movement of the moulding belts 207a, 207b is indicated in FIG. 8 by arrows 243.

As is known, polyethylene does not stick and is so smooth that no adhesive and no foamed multicomponent plastic material normally adheres firmly to it. By the introduction of a hose 131 of polyethylene between the moulding belts 107a, 107b, and by introducing a fluid under pressure which may be a liquid or a gas and then relieving the pressure, a pipe or tube can be produced from the multicomponent plastic material.

By pulling the polyethylene hose 131 out of the hardened multicomponent foamed plastic pipe or tube 138, after the removal of the pressure fluid, by means of the thread 135 it can be ensured that the polyethylene hose 131 is detached only gradually. The polyethylene hose 131 is a thin hose.

It is the mandrel 128 which forms and determines the hollow interior of the pipe or tube 138 which is being produced.

By all this it is made possible to produce pipes and tubes of finite lengths up to a maximum of 10 to 20 meters. The length limitation is imposed by the limited length of the polyethylene hose which can be accommodated on the mandrel.

However, the embodiment of FIGS. 7 and 8 enables pipes and tubes of any desired length to be made from multicomponent plastic material.

This is due to the provision of the mandrel 228 extending into the space between the two moulding belts 207a, 207b, the mandrel 228 passing through the ring-shaped nozzle 208 (FIG. 8) for the multicomponent plastic material, the mandrel carrying at least one length of polyethylene hose 231 into which a pressure-fluid passage 229 within the mandrel 228 leads from a pulsating pressure source, the mandrel 228 being able to move axially and being connected to the reciprocating drive mechanism 251 synchronized with the pulsations of the pressure fluid. When the hose is inflated, the drive mechanism 251 moves the mandrel 228 approximately in unison with the moulding belts 207a, 207b.

The way in which a tube or pipe is produced in the machine of the third embodiment is that the multicomponent plastic material, already in a rapidly thickening condition and assuming a pastelike consistency, emerges from the ring-shaped nozzle 208 and is continuously forced between the moulding belts 207a, 207b by the polyethylene hose on the mandrel. Since polyethylene is so smooth that it does not stick, it is ensured that the hose separates from the foamed plastic material each time a compression of the pressure fluid in the hose is followed by a reduction of the pressure, whereupon the hose can be withdrawn, then reinflated and expanded and is thus caused to move in unison with the moulding belts carrying the multicomponent plastic material with it. This produces a tube or pipe, the cross section of which can be varied, as desired, depending on the shape of the mandrel and of the hose used.

The mode of operation of this machine is improved in the embodiment of FIGS. 7 and 8 by fitting the mandrel 228 with the tubular member 253 carrying a second length of polyethylene hose 255 and having the internal pressure-fluid passage 256, the tubular member 253 being arranged to reciprocate on the mandrel 228 under the action of the reciprocating drive 254 which moves it in counterphase to the motion of the mandrel 228. The advantage of this embodiment is that the hose 231 on the mandrel 228 can easily be detached and withdrawn while the hose 225 on the tubular member 253 is forcing the multicomponent plastic material against the moulding belts 207a, 207b and thus holding it steady. This procedure takes place in reverse when the hose 255 on the tubular member 253 is being detached while the hose 231 on the mandrel 228 is acted upon by the fluid under pressure.

I claim:

1. A moulding for producing moulded articles from settable plastics material comprising in combination:
   a feed pipe to receive settable plastics material;
   heating means to heat said plastics material to a pastelike consistency whilst said plastics material is in transit in said feed pipe;
   two endless travelling mould means cooperating along portions of their respective paths to define a continuous mould cavity;
   a nozzle having a duct communicating with said feed pipe to eject said plastics material into said mould cavity;
   said duct encompassing a central passage in said nozzle and having an external wall in close proximity to said mould means;
   said nozzle projecting between said two endless mould means into said mould cavity defined therebetween and having an exit orifice within said cavity; and
   guide means to guide elongate material along a path extending in said central passage and said mould cavity.

2. A moulding machine as defined in claim 1, comprising further guide means to guide strip material through respective further passages between said outer wall of said duct and the respective ones of said two endless mould means and into said mould cavity.

3. A moulding machine as defined in claim 1, wherein said elongate material comprises inflatable tubular material guided through said central passage and into said mould cavity, whereby said inflatable material when within the moulded article may be inflated.

4. A moulding machine as defined in claim 3, wherein said central passage comprises a slot of substantially rectangular cross section.

5. A moulding machine as defined in claim 1, further comprising a mandrel extending through said central passage and projecting therefrom into said mould cavity, a shroud of said elongate material shrouding an end portion of said mandrel in said mould cavity and extending through said central passage, said mandrel having at least a first internal passage to supply fluid under pressure to the interior of said shroud, and said guide means comprising a gap defined between the outer surface of said mandrel and said internal wall of said duct for the introduction of said shroud into said cavity.

6. A moulding machine as defined in claim 5, wherein said central passage is substantially circular in cross section, said mandrel is substantially cylindrical and said gap is annular, and said elongate material comprises a polyethylene hose.

7. A moulding machine as defined in claim 6, wherein said end portion of said mandrel is provided with two protruding annular ribs which are spaced a predetermined distance apart along the axis of said mandrel, and said mandrel is provided with a second fluid passage terminating between said annular ribs and communicating with the atmosphere.

8. A moulding machine as defined in claim 1, further comprising a mandrel extending through said central passage and projecting therefrom into said mould cavity, an envelope of said elongate material shrouding an end portion of said mandrel inside said mould cavity, and means for reciprocating said mandrel to guide said envelope of elongate material along a path extending into said central passage and said mould cavity, said mandrel having an internal passage to supply a fluid under pulsating pressure to said envelope, and means to reciprocate said mandrel in synchronism with said pulsations.

9. A moulding machine as defined in claim 8, wherein said elongate material comprises a polyethylene hose.

10. A moulding machine as defined in claim 1, further comprising a mandrel extending through said central passage and projecting therefrom into said mould cavity, a first envelope of said elongate material shrouding an end portion of said mandrel inside said mould cavity, means for reciprocating said mandrel to guide said first envelope of elongate material along a path extending in said cavity, a tubular member slidably mounted on an intermediate portion of said mandrel, a further envelope of said elongate material mounted on said tubular member, said mandrel having an internal passage to supply fluid under pulsating pressure to said first envelope, said tubular member having an internal passage to supply fluid under pulsating pressure to said further envelope, and means to reciprocate said mandrel in synchronism with said pulsations of said fluid supplied to said first envelope, further means to reciprocate said tubular member relative to said mandrel to guide said further envelope of said elongate material along a path extending into said central passage and said mould cavity, and means to coordinate said reciprocal movement of said tubular member in counterphase to said reciprocal movement of said mandrel.

11. A moulding machine as defined in claim 10, wherein said elongate material comprises a polyethylene hose.